(12) United States Patent
Kodama

(10) Patent No.: US 9,685,642 B2
(45) Date of Patent: Jun. 20, 2017

(54) SEALED STORAGE BATTERY

(71) Applicant: SANYO ELECTRIC CO., LTD., Daito-shi, Osaka (JP)

(72) Inventor: Yasunobu Kodama, Hyogo (JP)

(73) Assignee: SANYO ELECTRIC CO., LTD., Daito-shi (JP)

( * ) Notice: Subject to any disclaimer, the term of this patent is extended or adjusted under 35 U.S.C. 154(b) by 0 days.

(21) Appl. No.: 15/113,312

(22) PCT Filed: Jan. 26, 2015

(86) PCT No.: PCT/JP2015/000318
§ 371 (c)(1),
(2) Date: Jul. 21, 2016

(87) PCT Pub. No.: WO2015/115080
PCT Pub. Date: Aug. 6, 2015

(65) Prior Publication Data
US 2017/0005300 A1   Jan. 5, 2017

(30) Foreign Application Priority Data

Jan. 30, 2014   (JP) ................................ 2014-015251

(51) Int. Cl.
*H01M 2/02*     (2006.01)
*H01M 2/08*     (2006.01)
(Continued)

(52) U.S. Cl.
CPC ........... *H01M 2/027* (2013.01); *H01M 2/024* (2013.01); *H01M 2/0212* (2013.01);
(Continued)

(58) Field of Classification Search
CPC .. H01M 2/0212; H01M 2/0217; H01M 2/024; H01M 2/027; H01M 2/0285;
(Continued)

(56) References Cited

U.S. PATENT DOCUMENTS 6,265,102 B1   7/2001   Shrim et al.

FOREIGN PATENT DOCUMENTS

JP      61-290644 A     12/1986
JP      62-55865 A      3/1987
(Continued)

OTHER PUBLICATIONS

International Search Report dated Mar. 3, 2015, issued in counterpart International Application No. PCT/JP2015/000318 (2 pages).

*Primary Examiner* — Brittany Raymond
(74) *Attorney, Agent, or Firm* — Westerman, Hattori, Daniels & Adrian, LLP

(57) ABSTRACT

A sealed storage battery that is easy to produce, has a low short circuit risk, and has an improved total energy density is provided. A battery includes a first metal sheet having a recessed portion, the recessed portion having a flange portion at its periphery, a multilayer electrode assembly housed in the recessed portion, and a second metal sheet covering the flange portion and the recessed portion. The first metal sheet and the second metal sheet also serve as electrodes. The flange portion is joined to the second metal sheet with a hot-melt resin. A joint between the flange portion and the second metal sheet is folded back toward the recessed portion. An outer edge of the flange portion folded back toward the recessed portion protrudes relative to an outer edge of the second metal sheet folded back toward the recessed portion.

3 Claims, 3 Drawing Sheets

(51) Int. Cl.
*H01M 2/30* (2006.01)
*H01M 10/04* (2006.01)
*H01M 10/052* (2010.01)
*H01M 10/058* (2010.01)

(52) U.S. Cl.
CPC ....... *H01M 2/0217* (2013.01); *H01M 2/0285* (2013.01); *H01M 2/08* (2013.01); *H01M 2/30* (2013.01); *H01M 10/0436* (2013.01); *H01M 10/052* (2013.01); *H01M 10/058* (2013.01); *Y02E 60/122* (2013.01); *Y02P 70/54* (2015.11)

(58) Field of Classification Search
CPC ...... H01M 2/08; H01M 2/30; H01M 10/0436; H01M 10/052; H01M 10/058; Y02E 60/122; Y02P 70/54
See application file for complete search history.

(56) References Cited

FOREIGN PATENT DOCUMENTS

| JP | 62-296361 A | 12/1987 |
| JP | 1-239759 A | 9/1989 |
| JP | 2-250257 A | 10/1990 |
| JP | 4-319253 A | 11/1992 |
| JP | 11-102675 A | 4/1999 |
| JP | 2000-353503 A | 12/2000 |
| JP | 2001-256933 A | 9/2001 |
| JP | 2004-6124 A | 1/2004 |
| JP | 2005-108790 A | 4/2005 |
| JP | 2009-146812 A | 7/2009 |

SEALED STORAGE BATTERY

TECHNICAL FIELD

The present invention relates to a sealed storage battery that includes two metal sheets also serving as electrodes.

BACKGROUND ART

Patent Literature 1 discloses a sealed storage battery that includes a housing composed of two metal sheets also serving as electrodes, as illustrated in a perspective view of FIG. 1 and a cross-sectional view of FIG. 2 taken along the line A1-A2 of FIG. 1. At least one of the metal sheets has a recessed portion having a flange portion at its periphery. The two metal sheets are sealed with an adhesive film.

CITATION LIST

Patent Literature

PTL 1: Japanese Published Unexamined Patent Application No. 2004-6124

SUMMARY OF INVENTION

Technical Problem

The technique described in Patent Literature 1 obviates the need for a metal terminal protruding from the housing and improves the production efficiency of the battery. However, the flange portion joining the two metal sheets decreases the total energy density of the battery.

It is an object of the present invention to provide a sealed storage battery that is easy to produce, has a low short circuit risk, and has an improved total energy density.

Solution to Problem

In order to achieve the object, a sealed storage battery according to the present invention is a battery that includes a first metal sheet having a recessed portion, the recessed portion having a flange portion at its periphery, a multilayer electrode assembly housed in the recessed portion, and a second metal sheet covering the flange portion and the recessed portion. The first metal sheet and the second metal sheet also serve as electrodes. The flange portion is joined to the second metal sheet with a hot-melt resin. A joint between the flange portion and the second metal sheet is folded back toward the recessed portion. An outer edge of the flange portion folded back toward the recessed portion protrudes relative to an outer edge of the second metal sheet folded back toward the recessed portion.

Advantageous Effects of Invention

A sealed storage battery according to the present invention has an improved total energy density because the joint between the flange portion of the first metal sheet and the second metal sheet is folded back toward the recessed portion. Furthermore, since the outer edge of the flange portion folded back toward the recessed portion protrudes relative to the outer edge of the second metal sheet folded back toward the recessed portion, a battery having a low short circuit risk can be easily produced.

DESCRIPTION OF EMBODIMENTS

Figure 1:
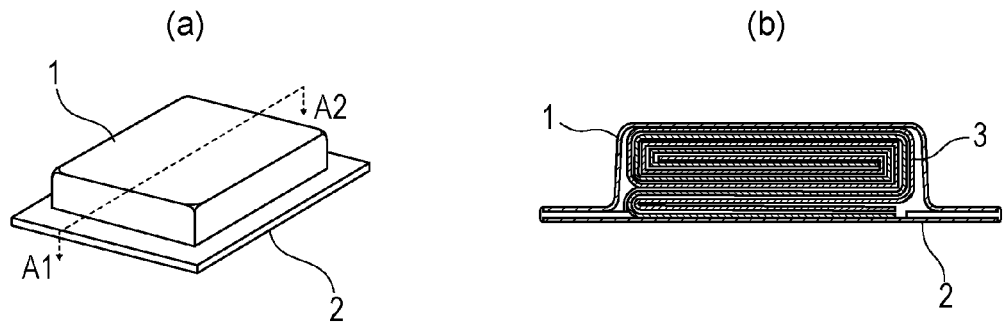
FIG. 1 is a perspective view of a battery described in Patent Literature 1 and a cross-sectional view taken along the line A1-A2.

Embodiments of the present invention will be described in detail below. The drawings referred in the embodiments are schematically illustrated, and the dimensions of constituents in the drawings may be different from the actual dimensions of the constituents. Specific dimensions should be determined in consideration of the following description.

First Embodiment

Figure 2:
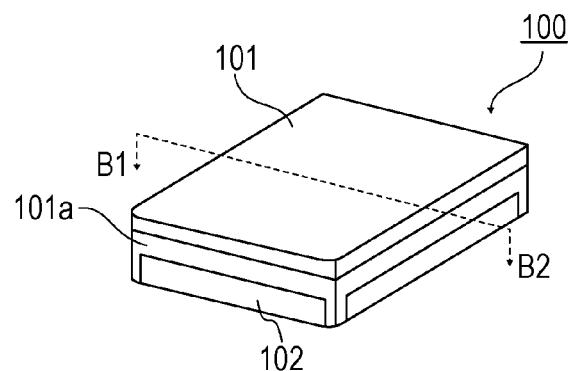
FIG. 2 is a perspective view of a battery according to an embodiment.
Figure 3:
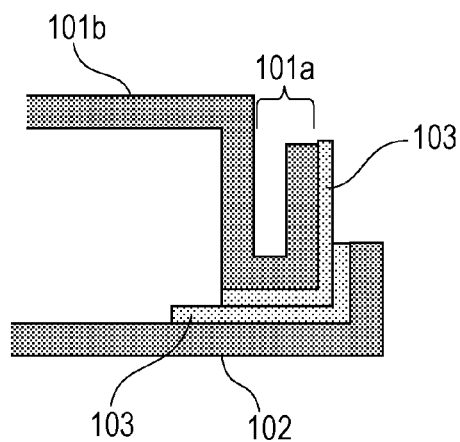
FIG. 3 is a cross-sectional view of a B2 side portion in a cross section taken along the line B1-B2 of FIG. 2.

FIG. 2 is a perspective view of an appearance of a sealed storage battery according to a first embodiment of the present invention. FIG. 3 is a cross-sectional view of a B2 side portion in a cross section taken along the line B1-B2 of FIG. 2.

Figure 4:
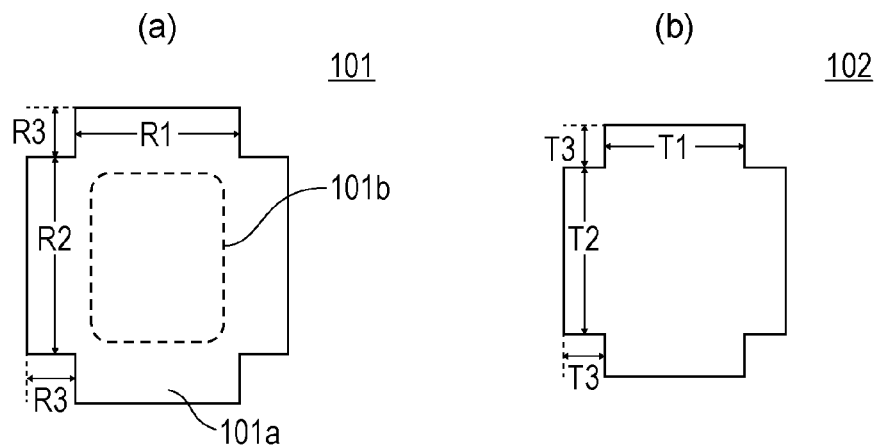
FIG. 4 is a plan view of a first metal sheet 101 and a second metal sheet 102 according to an embodiment.

As illustrated in FIGS. 3 and 4, a battery 100 includes a first metal sheet 101 having a recessed portion 101b, the recessed portion 101b having a flange portion 101a at its periphery, a multilayer electrode assembly (not shown) housed in the recessed portion, and a second metal sheet 102 covering the flange portion 101a and the recessed portion 101b. The first metal sheet 101 and the second metal sheet 102 constitute a housing and also serve as electrodes. The flange portion 101a is joined to the second metal sheet 102 with a hot-melt resin 103. The flange portion 101a and the second metal sheet 102 are folded back along a side surface of the recessed portion 101b. An outer edge of the folded back flange portion 101a protrudes relative to an outer edge of the second metal sheet 102.

A method for producing the battery 100 will be described below.

<Production of Positive Electrode>

94 parts by weight of a positive-electrode active material $LiCoO_2$, 3 parts by weight of a conductive aid carbon black, and 3 parts by weight of a poly(vinylidene fluoride) binder were mixed with a N-methyl-2-pyrrolidone (NMP) solution serving as a solvent to prepare a positive electrode slurry. The positive electrode slurry was applied to both faces of a positive electrode current collector formed of aluminum foil having a thickness of 15 μm and was dried to form a positive electrode active material layer. The positive electrode active material layer was then pressed with a roller and was cut into a belt-like positive electrode of a predetermined size. The completed positive electrode was placed on a negative electrode with a separator interposed therebetween and was wound to form an electrode assembly having a winding structure. The outermost periphery of the electrode assembly was not coated with a positive electrode mixture paste, thereby leaving an exposed portion on both faces of the positive electrode current collector. The positive electrode had a width of 332 mm and a height of 22 mm. The exposed portion at the outermost periphery of the wound positive electrode current collector had a length of 20 mm.

<Production of Negative Electrode>

96% by mass of a graphite powder serving as a negative-electrode active material, 2% by mass of a carboxymethyl-cellulose (CMC) binder, 2% by mass of styrene-butadiene rubber (SBR), and pure water serving as a solvent were mixed to prepare a negative electrode slurry. The negative electrode slurry was applied to both faces of a negative electrode current collector formed of copper foil having a thickness of 10 µm and was dried to form a negative electrode slurry. The negative electrode slurry was then pressed with a roller and was cut into a sheet-like negative electrode of a predetermined size. The completed negative electrode was placed on a positive electrode with a separator interposed therebetween and was wound to form an electrode assembly having a winding structure. The outermost periphery of the electrode assembly was not coated with a paste containing a negative electrode, thereby leaving an exposed portion on both faces of the negative electrode current collector. The negative electrode had a width of 331 mm and a height of 23 mm. The exposed portion at the outermost periphery of the wound negative electrode current collector had a length of 20 mm.

<Preparation of Non-Aqueous Electrolytic Solution>

1 M (mol/l) of $LiPF_6$ was dissolved in a mixed solvent of ethylene carbonate (EC) and diethyl carbonate (DEC) mixed at a volume ratio of 30:70 to prepare a non-aqueous electrolytic solution.

<Production of Multilayer Electrode Assembly>

The positive electrode and the negative electrode were wound with a polyethylene microporous membrane (width: 751 mm, height: 24 mm, thickness: 20 µm) separator interposed therebetween and were pressed flat. The separator was then fixed with a tape.

<Production of Battery>

A first metal sheet 101 illustrated in FIG. 4(a) was prepared. The first metal sheet 101 had a recessed portion 101b having a flange portion 101a at its periphery. An electrode assembly was inserted into the recessed portion 101b. An exposed portion of a positive electrode current collector at the outermost periphery of the wound electrode assembly was in contact with the inner surface of the recessed portion 101b. The flange portion 101a had R1 of 2.8 cm, R2 of 2.8 cm, and R3 of 0.3 cm. The recessed portion 101b was 2.7 cm long, 2.7 cm wide, and 0.35 cm deep. The first metal sheet 101 was formed of aluminum.

The recessed portion 101b was then covered with a second metal sheet 102 illustrated in FIG. 4(b). The inner surface of the second metal sheet 102 was in contact with an exposed portion of a negative electrode current collector at the outermost periphery of the wound electrode assembly. The second metal sheet had T1=2.75 cm, T2=2.75 cm, and T3 of 0.25 cm. The second metal sheet 102 was formed of nickel.

A 70 µm hot-melt resin 103 was deposited in advance on the flange portion 101a and a portion of the second metal sheet 102 facing the flange portion 101a. The hot-melt resin 103 was modified polypropylene.

The exposed portion of the positive electrode current collector was welded to the inner surface of the recessed portion 101b, and the exposed portion of the negative electrode current collector was welded to the inner surface of the second metal sheet 102.

The flange portion 101a was joined by thermocompression bonding to three faces of the second metal sheet 102 facing the flange portion 101a. A non-aqueous electrolytic solution was then injected into the recessed portion 101b in which the wound electrode assembly was housed. The flange portion 101a was then joined by thermocompression bonding to the remaining one face of the second metal sheet 102 facing the flange portion 101a.

The flange portion 101a and the opposite second metal sheet were folded back toward the recessed portion 101b, thus producing a battery 100. After folding back, in each folded back portion, the outer edge of the flange portion 101a protruded relative to the second metal sheet in each side.

In the battery 100 according to the first embodiment having no metal terminal for collecting electric current, the flange portion 101a and the second metal sheet 102 were folded back toward the recessed portion 101b. Thus, the battery 100 has a higher total energy density than known batteries. Furthermore, since the flange portion 101a and the second metal sheet 102 were folded back toward the recessed portion with the outer edge of the flange portion 101a protruding relative to the outer edge of the second metal sheet 102, a battery having a low short circuit risk can be easily produced.

Modified Examples

Figure 5:
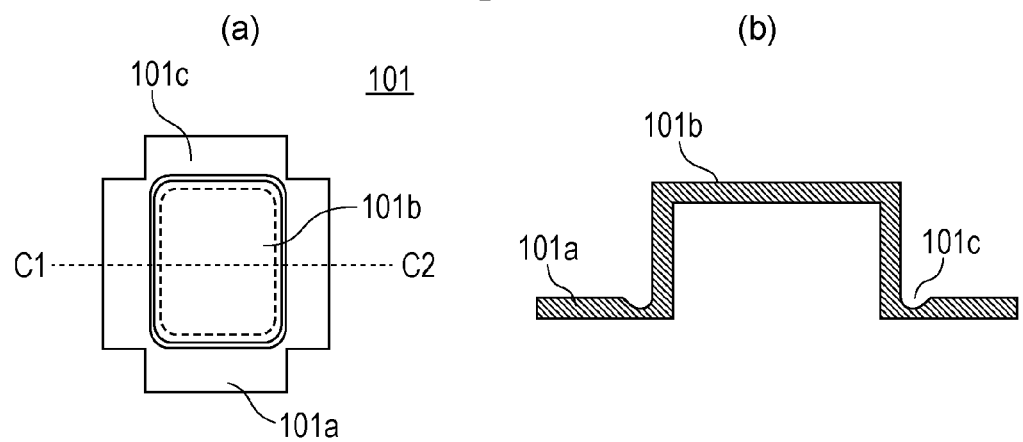
FIG. 5 is a plan view of a first metal sheet 101 used in Modified Example 1 and a cross-sectional view taken along the line C1-C2.

FIG. 5(a) is a plan view of a first metal sheet 101 before folding back in a sealed storage battery according to Modified Example 1 of the first embodiment. FIG. 5(b) is a cross-sectional view taken along the line C1-C2. As illustrated in FIGS. 5(a) and 5(b), a flange portion 101a of the first metal sheet 101 has a recessed portion 101c for facilitating folding back. The shape of the recessed portion 101c for folding back is not limited to the shape illustrated in FIG. 5(b) and may be triangular. Although not shown in the figure, a second metal sheet 102 also has a recessed portion for folding back. A recessed portion for folding back is disposed in at least one of the flange portion 101a and the second metal sheet 102.

The recessed portion for folding back is formed, for example, by press working or notching of the first metal sheets 101 and 102. When a recessed portion for folding back is formed by press working in the first metal sheet 101 or 102, a raised portion may be formed opposite the recessed portion of each metal sheet.

Figure 6:
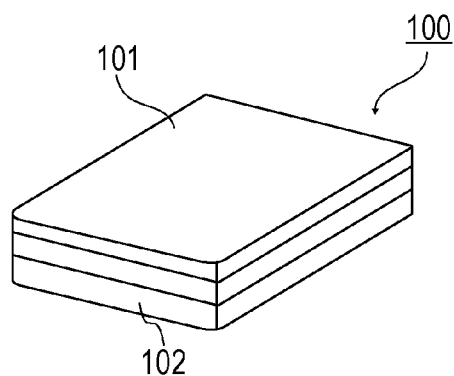
FIG. 6 is a perspective view of a battery according to Modified Example 2.

FIG. 6 is a sealed storage battery according to Modified Example 2 of the first embodiment. In the first metal sheets 101 and 102 illustrated in FIG. 6, R1=T1, R2=T2, and R3>T3.

Figure 7:
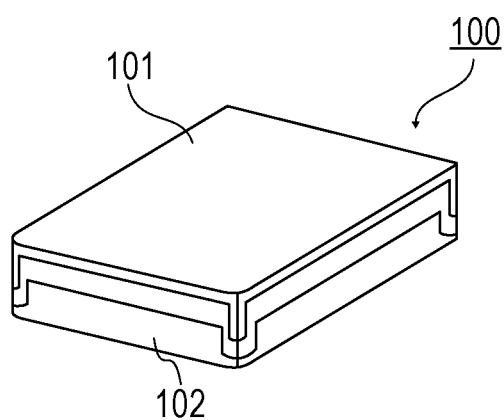
FIG. 7 is a perspective view of a battery according to Modified Example 3.

FIG. 7 is a sealed storage battery according to Modified Example 3 of the first embodiment. In FIG. 7, all the outer edges of a folded back second metal sheet 102 are smaller than a flange portion 101a of a first metal sheet 101, and the outer edges of the folded back flange portion 101a are partly separated from each other.

The phrase "a joint between a flange portion 101a and a second metal sheet 102 is folded back toward a recessed portion" means that the joint is folded back toward the bottom side of the recessed portion.

Each outer edge of the flange portion 101a preferably protrudes by 0.01 to 3 mm relative to each opposite outer edge of the second metal sheet 102.

The flange portion 101*a* and a portion of the second metal sheet 102 facing the flange portion 101*a* are folded back toward the recessed portion on at least one face. The face to be folded back depends on the shape of equipment in which the battery 100 is used.

Except for the recessed portion 101*b*, the first metal sheet 101 may be bonded by thermocompression bonding to the second metal sheet 102 with a hot-melt resin 103.

The hot-melt resin 103 may be a modified polyolefin. The hot-melt resin may have a heat-resistant layer. The heat-resistant layer may be formed of polyimide.

Although the flange portion 101*a* of the first metal sheet 101 and the second metal sheet 102 are provided in advance with a hot-melt resin of the same type in the first embodiment, the flange portion 101*a* of the first metal sheet 101 and the second metal sheet 102 may be provided with different hot-melt resins. The hot-melt resin 103 may be applied only to the flange portion 101*a* of the first metal sheet 101 or the second metal sheet 102. After a hot-melt resin is inserted using the flange portion 101*a* of the first metal sheet 101 and the second metal sheet 102 on which no hot-melt resin is deposited, the flange portion 101*a* of the first metal sheet 101 and the second metal sheet 102 may be bonded together.

In the case where the second metal sheet 102 is a flat sheet, the hot-melt resin 103 on the second metal sheet 102 can extend 0.1 to 3 mm from the bonded inner edge and thereby more reliably prevent the short circuit between the positive and negative metal sheets.

Although the second metal sheet 102 is a flat sheet in the first embodiment, the second metal sheet 102 may have a recessed portion and a flange portion, like the first metal sheet 101.

The first metal sheets 101 and 102 may be formed of aluminum, stainless steel, nickel, and/or copper. The first metal sheets 101 and 102 preferably have a thickness in the range of 10 to 300 μm.

[Others]

The positive-electrode active material is not limited to lithium cobalt oxide used in the first embodiment and may be lithium nickel oxide, lithium manganese oxide, lithium cobalt nickel composite oxide, lithium cobalt manganese composite oxide, lithium nickel manganese composite oxide, or one of these compounds in which these transition metal elements are partly substituted with Al, Mg, Zr, and/or the like.

The negative-electrode active material may be any material that allows intercalation/deintercalation of lithium ions, such as graphite, coke, tin oxide, metallic lithium, silicon, or a mixture thereof, as well as graphite such as natural graphite or artificial graphite.

The non-aqueous electrolytic solution is also not limited to one described in the first embodiment. For example, $LiBF_4$, $LiPF_6$, $LiN(SO_2CF_3)_2$, $LiN(SO_2C_2F_5)_2$, and/or $LiPF_{6-x}(C_nF_{2n+1})_x$ [$1<x<6$, $n=1$ or $2$] may be used alone or in combination as a supporting salt or supporting salts. The concentration of the supporting salt is not particularly limited and desirably ranges from 0.8 to 1.8 mol per liter of electrolytic solution. Apart from EC and MEC, the type of solvent is preferably a carbonate solvent, such as propylene carbonate (PC), γ-butyrolactone (GBL), ethyl methyl carbonate (EMC), dimethyl carbonate (DMC), or diethyl carbonate (DEC), more preferably a combination of a cyclic carbonate and a chain carbonate.

A polymer electrolyte as well as a non-aqueous electrolytic solution may be used as a non-aqueous electrolyte.

REFERENCE SIGNS LIST

1 Housing and positive electrode, 2 housing and negative electrode, 3 electric-power generating element, 100 battery, 101 first metal sheet, 101*a* flange portion, 101*b* recessed portion, 101*c* recessed portion for folding back, 102 second metal sheet, 103 hot-melt resin.

The invention claimed is:

1. A sealed storage battery comprising: a first metal sheet having a recessed portion, the recessed portion having a flange portion at its periphery; a multilayer electrode assembly in the recessed portion; and a second metal sheet covering the flange portion and the recessed portion,
   wherein the first metal sheet and the second metal sheet also serve as electrodes, the flange portion is joined to the second metal sheet with a hot-melt resin,
   a joint between the flange portion and the second metal sheet is folded back toward the recessed portion, and
   an outer edge of the flange portion folded back toward the recessed portion protrudes relative to an outer edge of the second metal sheet folded back toward the recessed portion.

2. The sealed storage battery according to claim 1, wherein the outer edge of the flange portion protruding relative to the outer edge of the second metal sheet is provided with the hot-melt resin.

3. The sealed storage battery according to claim 1, wherein the joint between the flange portion and the second metal sheet is folded back along a recessed portion for folding back.

\* \* \* \* \*